United States Patent Office 3,024,698
Patented Mar. 13, 1962

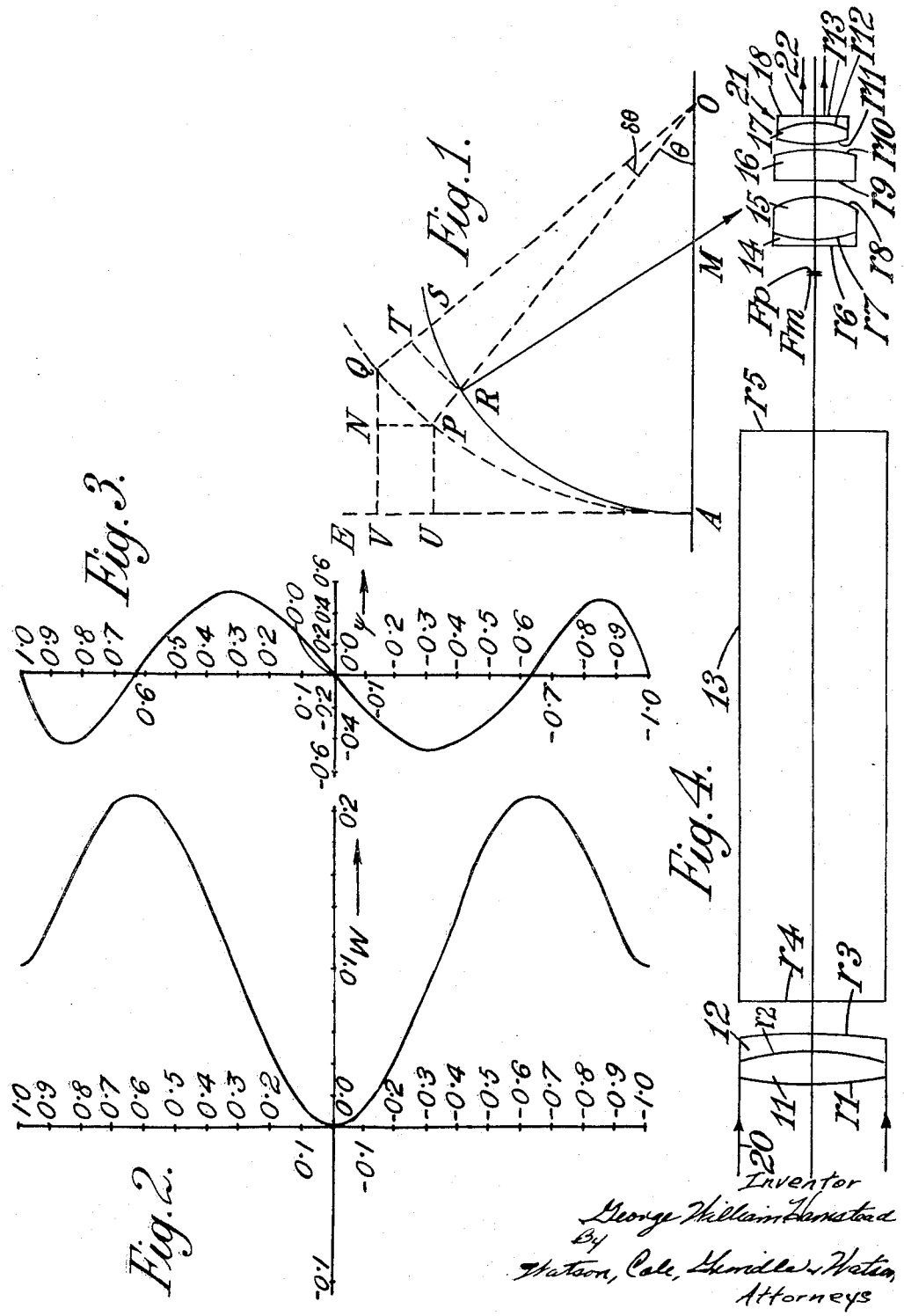

3,024,698
OPTICAL SYSTEMS IN WHICH PARALLAX IS ELIMINATED
George William Hamstead, Barnet, England, assignor to W. Watson & Sons Limited, Barnet, Hertfordshire, England, a company of Great Britain
Filed Jan. 20, 1958, Ser. No. 710,090
Claims priority, application Great Britain Jan. 23, 1957
4 Claims. (Cl. 88—57)

The invention relates to optical systems and is more particularly concerned with optical image producing systems for focussing rays to form an image of an object. Owing to aberrations and other imperfections, practical image producing systems do not form a perfect image of an object. In particular, the position on the axis at which rays are brought to a focus varies with the fractional aperture of the zone of the exit pupil through which the rays pass.

It is an object of the invention to provide an improved optical image producing system.

The invention provides an optical image producing system having the best focus for definition coincident with the focus at which parallax is eliminated or at a minimum.

The invention also provides an optical image producing system which satisfies the condition that rays considered to pass, according to the laws of optics, through the zone of the exit pupil having a fractional aperture of substantially $$\sqrt{\frac{7}{5}}$$

are brought by the system to the paraxial focus thereof. If the exit pupil is defined by the stop, and could be increased by removal of the stop to expose the said zone, then on such removal the said rays passing through that zone to the said focus would exist; otherwise the said rays do not exist but their path can be constructed or calculated.

The invention also provides an optical image producing system which satisfies the condition that rays which pass through the zone of the exit pupil having a fractional aperture of substantially one (i.e. marginal rays) are brought by the system to a focus on the axis thereof which focus (referred to as the marginal focus) is distant from the paraxial focus by substantially ⅚ of the distance between the paraxial focus and the focus on the axis to which rays which pass through the zone of the exit pupil having a fractional aperture substantially $$\frac{1}{\sqrt{2}}$$

are brought by the system.

The invention will now be further described with reference to the accompanying drawings, in which:

FIGURE 1 is a diagram showing a wave-front which has emerged from the exit pupil of an optical image producing system, FIGURES 2 and 3 are graphs of some mathematical expressions referred to in the description, and FIGURE 4 is a diagram of a specific optical system embodying the invention.

In FIGURE 1, O is a selected focal position on the axis AO of the system; that is to say an image-receiving surface or a graticule or the like intercepts the axis at O or is conjugate therewith, or an eyepiece is focussed on to O. AE represents the plane of the exit pupil, APQ is the section of the reference sphere centred on O, ARS is the section of the wave-front, RM is a ray, defined as a normal to the wave-front, RO is the normal to the reference sphere and is the ideal direction of RM.

The angular aberration $\Psi$ (psi) is measured by the angle MRO. RT is drawn as an arc of a circle centred on O to cut QO at T.

If the angle $A\hat{O}R=\theta$ and the angle $R\hat{O}S=\delta\theta$ (i.e. a small increase in $\theta$), then considering the triangle RST, when $\delta\theta$ is small it is seen that:

angle $S\hat{R}T$ = angle $M\hat{R}O = \Psi$ and $$\tan \psi = \frac{TS}{TR}$$

The wave-front aberration W, at $\theta$, is defined as $$W = N.PR = [PR]$$

the medium having a refractive index N. At $\theta + \delta\theta$ the wave-front aberration becomes $W + \delta W$ so $$W + \delta W = [QS] = [QT] + [TS]$$

Obviously $PR = QT$ to $[PR] = [QT]$ and therefore $$\delta W = [TS]$$

so that $$TS = \frac{1}{N} \cdot \delta W$$

Provided that W is very much less than AO it is seen that, very nearly, $$RT = PQ$$

and $$PN = PQ \cos \theta$$

with $$PN = UV$$

Since $AU = \rho$ (rho) = the zonal aperture ($\rho_0$ being the maximum value of $\rho$ i.e. the radius of the exit pupil)

$$UV = \delta\rho$$

Thus:

$$\tan \psi = \frac{1}{N} \cdot \frac{\delta W}{\delta \rho} \cdot \cos \theta$$

Taking the limit as $\delta\rho \to 0$:

$$\tan \psi = \frac{1}{N} \cdot \frac{dW}{d\rho} \cdot \cos \theta$$

For small aberrations $\tan \psi \to \psi$ and $\cos \theta$ may be taken as unity (for a focus at infinity $\cos \theta = 1$) and consequently:

$$\psi = \frac{1}{N} \cdot \frac{dW}{d\rho}$$

The axial spherical aberration with respect to the paraxial focus may be represented by a two term formula. Denoting $W_p$ as the wave-front aberration with respect to the paraxial focus:

$$W_p = a_4 \left(\frac{\rho}{\rho_0}\right)^4 + a_6 \left(\frac{\rho}{\rho_0}\right)^6$$

where the coefficients $a_4$ and $a_6$ conventionally represent the primary and secondary spherical aberration of the system respectively.

If the selected focus O is not the paraxial focus then a term $$a_2 \left(\frac{\rho}{\rho_0}\right)^2$$

proportional to the square of the fractional aperture $$\frac{\rho}{\rho_0}$$

has to be added to $W_p$, $a_2$ being a factor dependent upon the distance of O from the paraxial focus.

Thus:
$$W = a_2\left(\frac{\rho}{\rho_0}\right)^2 + W_D$$

and:
$$W = a_2\left(\frac{\rho}{\rho_0}\right)^2 + a_4\left(\frac{\rho}{\rho_0}\right)^4 + a_6\left(\frac{\rho}{\rho_0}\right)^6$$

The criterion of the definition, D, of an optical system is taken as:
$$D = \frac{I}{I_0} = \left[1 - \frac{2\pi^2}{\lambda^2}E_0\right]^2$$

I is the intensity at the centre of the diffraction image that the system produces of an ideal point object, $I_0$ is the intensity in the ideal case of the system being free from aberration, $\lambda$ is the wave-length of the light, and $E_0$ is defined as:
$$E_0 = \int_0^1 W^2.dV - \left[\int_0^1 W.dV\right]^2$$

where W is the wave-front aberration above referred to, and V is the square of the fractional aperture, i.e.
$$V = \left(\frac{\rho}{\rho_0}\right)^2$$

The above criterion of the definition is valid provided that the definition approximates to the so-called Rayleigh limit, that is to say D is not less than 0.8. When $D = 0.8$
$$E_0 = \frac{\lambda^2}{187}$$

For D to be at maximum, $E_0$ must be at a minimum. For the above quoted expression, for $E_0$ to be at a minimum,
$$a_2 = -\left(a_4 + \frac{9}{10}a_6\right)$$

For zero parallax at the edge of the exit pupil:
$$\Psi_M = 0$$

This condition gives:
$$a_4 = -\frac{21}{19}a_6$$

so that
$$a_2 = \frac{6}{5}a_6$$

and
$$W = a_6\left\{\frac{6}{5}\left(\frac{\rho}{\rho_0}\right)^2 - \frac{21}{10}\left(\frac{\rho}{\rho_0}\right)^4 + \left(\frac{\rho}{\rho_0}\right)^6\right\}$$

with
$$\psi = \frac{a_6}{\rho_0}\left\{\frac{12}{5}\left(\frac{\rho}{\rho_0}\right) - \frac{42}{5}\left(\frac{\rho}{\rho_0}\right)^3 + 6\left(\frac{\rho}{\rho_0}\right)^5\right\}$$

and
$$E_0 = \frac{33}{14,000}a_6^2$$

For D to be not less than 0.8 it follows that $|a_6|$ is not greater than $1.5062\lambda$. $\Psi$ has zeros at
$$\frac{\rho}{\rho_0} = \pm 1, \quad = \pm\sqrt{\frac{2}{5}}, \quad = 0$$

The turning values of $\Psi$ are at
$$\left(\frac{\rho}{\rho_0}\right)^2 = \frac{21 \pm \sqrt{241}}{50}$$

or
$$\frac{\rho}{\rho_0} = \pm 0.854682 \text{ and } \pm 0.330936$$

with corresponding values of
$$\psi = \mp 0.456763\frac{a_6}{\rho_0} \text{ and } \pm 0.513617\frac{a_6}{\rho_0} \text{ respectively}$$

FIGURE 2 shows the last quoted expression for W, expressed in units of $a_6$. FIGURE 3 shows the last quoted expression for $\Psi$ expressed in units of
$$\frac{a_6}{\rho_0}$$

For the aforementioned limiting value for $|a_6| = 1.5062\lambda$ and an objective of 25 mm. clear aperture the larger zonal value of $\Psi$ is about 7 seconds of arc. $|a_6|$ is limited to about $\lambda/5$ per second of arc of parallax. If we measure $\Psi$ with respect to the paraxial focus:
$$\psi_p = \frac{a_6}{\rho_0}\left\{-\frac{42}{5}\left(\frac{\rho}{\rho_0}\right)^3 + 6\left(\frac{\rho}{\rho_0}\right)^5\right\}$$

For zero longitudinal spherical aberration $\Psi_p = $ zero and this is so if
$$\left(\frac{\rho}{\rho_0}\right)^2 = 0 \quad \text{or} \quad \left(\frac{\rho}{\rho_0}\right)^2 = \frac{7}{5}$$

Taking the latter case the required design criterion is that the ray passing through the zone of fractional aperture
$$\frac{\rho}{\rho_0} = \sqrt{\frac{7}{5}}$$

(numerical value = 1.183216) is brought to the paraxial focus.
$$W = \int_0^u LA u.du$$

where $LA = $ longitudinal spherical aberration at a paraxial angle $u$, with respect to the selected focal position O. Now if $u_0$ is the maximum paraxial angle:
$$\frac{u}{u_0} = \frac{\rho}{\rho_0}$$

$$u.du = \left(\frac{u_0}{\rho_0}\right)^2 \rho.d\rho$$

Therefore:
$$W = \int_0^\rho LA\left(\frac{u_0}{\rho_0}\right)^2 \rho.d\rho$$

Differentiating:
$$\frac{dW}{d\rho} = LA\left(\frac{u_0}{\rho_0}\right)^2.\rho$$

Where
$$LA = \left(\frac{\rho_0}{u_0}\right)^2 \frac{1}{\rho}\cdot\frac{dW}{d\rho}$$

From the expression for W quoted earlier, it follows that
$$LA = a_6\left(\frac{\rho_0}{u_0}\right)^2\left\{\frac{12}{5}\frac{1}{\rho_0^2} - \frac{42}{5}\frac{\rho^2}{\rho_0^4} + 6\frac{\rho^4}{\rho_0^6}\right\}$$
$$= \frac{a_6}{u_0^2}\left\{\frac{12}{5} - \frac{42}{5}\left(\frac{\rho}{\rho_0}\right)^2 + 6\left(\frac{\rho}{\rho_0}\right)^4\right\}$$

Thus $LA = 0$ when $\rho = \rho_0$ i.e. the selected focus is the marginal focus. (This follows since $\Psi_M$ has been assumed to be zero.) With respect to the paraxial focus:
$$LA_D = \frac{a_6}{u_0^2}\left\{-\frac{42}{5}\left(\frac{\rho}{\rho_0}\right)^2 + 6\left(\frac{\rho}{\rho_0}\right)^4\right\}$$

and for the marginal (or rim) rays $\rho = \rho_0$, so
$$LA_{DM} = \frac{12}{5}\cdot\frac{a_6}{u_0^2}$$

For the zonal rays for which $$\frac{\rho}{\rho_0} = \frac{1}{\sqrt{2}}$$

$$LA_{\text{DZ}} = \frac{27}{10} \cdot \frac{a_s}{u_0{}^2}$$

Comparing those two expressions, it follows that $$LA_{\text{DM}} = \frac{8}{9} LA_{\text{DZ}}$$

is equivalent to the condition that the rays passing through the $$\sqrt{\frac{7}{5}}$$

zone are brought to the paraxial focus.

The specific optical system shown diagrammatically in FIGURE 4 will now be described by way of example.

The system of this example is a sighting telescope for use in setting the sights of guns. The system, in use, is inserted in the muzzle of a gun so that the axis of the objective 11, 12 is aligned with the axis of the muzzle end of the bore of the gun. Light 20 from an object at an effectively infinite distance passes through the objective and through a prism system, the length and entrance and exit face $r4$, $r5$, are represented diagrammatically by the rectangle 13. The prism system 13 merely changes the direction of the axis of the light beam so that it is taken to an eyepiece 21 at an accessible position outside of the gun bore. The marginal rays of the light 20 are brought to a focus at $Fm$ which is the marginal focus of the system 11, 12, 13. A graticule having a fiducial mark, e.g. in the form of a small dot or crosslines, is positioned at $Fm$. The focus $Fm$ is 0.098 mm. (all dimensions hereinafter referred to are also in mm.) to the left of the paraxial focus $Fp$, which is 28.533 to the right of the surface $r5$. A ray through the zone of the exit pupil having a fractional aperture of $$\frac{1}{\sqrt{2}}$$

is brought to a focus at a distance of 0.110 to the left of the paraxial focus.

The eyepiece 21 is focussed on to the marginal focus $Fm$ and the graticule so that a parallel beam of light 22 emerges from the eyepiece. The joint image of the infinite object and the fiducial mark seen in the eyepiece has substantially no parallax and the maximum definition obtainable with the system. The graticule is positioned 5.505 to the left of the surface $r6$.

The shapes, sizes, relative positions and refractive indices of the components of the system are given in the following table:

| Component or lens element and air spacings | Surface radii in mm. | Axial distance ($d$ in mm.) between surfaces | Refractive index of components | Clear diameter ($D$ in mm.) of components and elements |
|---|---|---|---|---|
| 11 | $r_1 = 75.8$ | $d_1 = 6.0$ | 1.543 | $D_1 = 28.0$ |
| 12 | $r_2 = -41.8$ | $d_2 = 3.0$ | 1.626 | $D_2 = 28.0$ |
| Air | $r_3 = -140.0$ | $d_3 = 5.0$ | | |
| 13 | $r_4 = \infty$ | $d_4 = 106.0$ | 1.573 | $D_4 = 28.0$ |
| Air | $r_5 = \infty$ | $d_5 = 33.94$ | | |
| 14 | $r_6 = \infty$ | $d_6 = 1.0$ | 1.708 | $D_5 = 14.3$ |
| 15 | $r_7 = 22.3$ | $d_7 = 6.7$ | 1.512 | $D_6 = 14.3$ |
| Air | $r_8 = -14.3$ | $d_8 = 2.3$ | | |
| 16 | $r_9 = \infty$ | $d_9 = 5.5$ | 1.520 | $D_7 = 14.3$ |
| Air | $r_{10} = -20.5$ | $d_{10} = 0.9$ | | |
| 17 | $r_{11} = 32.0$ | $d_{11} = 3.5$ | 1.626 | $D_8 = 12.4$ |
| 18 | $r_{12} = -11.9$ | $d_{12} = 1.0$ | 1.626 | $D_9 = 12.4$ |
|  | $r_{13} = \infty$ |  |  |  |

The value of $a_s$ for the system 11, 12, 13 is approximately 1.32λ; the larger zonal value of $\varphi$ (i.e. the larger maxima in FIGURE 3) is only about 5½ seconds of arc and the smaller zonal value of $\varphi$ (i.e. the smaller maxima in FIGURE 3) is only about 5 seconds of arc.

The equivalent focal length of the objective 11, 12 is about 105 and the equivalent focal length of the eyepiece 21 is about 15. The telescope thus has a magnification of 7 times and an exit pupil diameter of 4.

The eyepiece 21 is corrected to a residual spherical aberration of λ/8 (equal to half the so-celled Rayleigh limit). It is corrected for coma and has a flat field when used in conjunction with the rest of the system.

The invention is not restricted to the details of the foregoing example. For instance, the distance between the surfaces $r3$ and $r4$ may be increased to 33.435 in which case the marginal focus falls at the surface $r5$ and the graticule may be placed on that curface, or on a cover plate cemented to that surface, the eyepiece being moved to focus on to it.

I claim:

1. An optical image producing system having spherical aberration and comprising refracting surfaces distributed along an optical axis, wherein the radii of the said surfaces, the axial distances between the said surfaces, the refractive indices of the media between the said surfaces and the apertures of the said surfaces, are selected so that rays which pass through the zone of the exit pupil having a fractional aperture of substantially one are brought by the system to a marginal focus on the axis, which marginal focus is between the object and the paraxial focus and is distant from the paraxial focus by substantially 8/9 of the distance between the paraxial focus and the focus on the axis to which rays which pass through the zone of the exit pupil having a fractional aperture substantially $$\frac{1}{\sqrt{2}}$$

are brought by the system, whereby the best focus for definition is coincident with the focus at which parallax is eliminated or at a minimum.

2. An optical image producing system as claimed in claim 1, including an eyepiece focussed on to the said marginal focus.

3. An optical image producing system having spherical aberration and comprising optical surfaces distributed along an optical axis, wherein the radii of the said surfaces, the axial distances between the said surfaces, the refractive indices of the media between the said surfaces and the apertures of the said surfaces, are selected so that rays which pass through the zone of the exit pupil having a fractional aperture of substantially one are brought by the system to a marginal focus on the axis, which marginal focus is between the object and the paraxial focus and is distant from the paraxial focus by substantially 8/9 of the distance between the paraxial focus and the focus on the axis to which rays which pass through the zone of the exit pupil having a fractional aperture substantially $$\frac{1}{\sqrt{2}}$$

are brought by the system, whereby the best focus for definition is coincident with the focus at which parallax is eliminated or at a minimum.

4. An optical image producing system as claimed in claim 3, including an eyepiece focussed on to the said marginal focus.

References Cited in the file of this patent

UNITED STATES PATENTS

| | | |
|---|---|---|
| 2,398,276 | Altman | Apr. 9, 1946 |
| 2,441,036 | Schade | May 4, 1948 |
| 2,500,017 | Altman | Mar. 7, 1950 |
| 2,559,881 | Kingslake et al. | July 10, 1951 |
| 2,784,645 | Grey | Mar. 12, 1957 |

(Other references on following page)

UNITED STATES PATENTS

| | | | |
|---|---|---|---|
| 2,814,969 | Kohler | Dec. 3, | 1957 |
| 2,893,290 | Miles | July 7, | 1959 |
| 2,899,862 | Baker | Aug. 18, | 1959 |

FOREIGN PATENTS

| | | | |
|---|---|---|---|
| 608,586 | Great Britain | Sept. 17, | 1948 |
| 784,596 | Great Britain | Oct. 9, | 1957 |
| 861,471 | Germany | Jan. 5, | 1953 |

OTHER REFERENCES

"The Principles of Optics," by A. C. Hardy and F. H. Perrin, 1st Edition, published in 1932, by McGraw-Hill Book Co., Inc., New York, N.Y., pages 68–79.